US012586187B2

(12) United States Patent (10) Patent No.: US 12,586,187 B2
Soliman et al. (45) Date of Patent: Mar. 24, 2026

(54) LESION LINKING USING ADAPTIVE SEARCH AND A SYSTEM FOR IMPLEMENTING THE SAME

(71) Applicant: Siemens Medical Solutions USA, Inc., Malvern, PA (US)

(72) Inventors: Ahmed Soliman, Farragut, TN (US); Vijay Shah, Knoxville, TN (US); Bruce Spottiswoode, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 345 days.

(21) Appl. No.: 18/514,059

(22) Filed: Nov. 20, 2023

(65) Prior Publication Data

US 2025/0166172 A1     May 22, 2025

(51) Int. Cl.
*G06T 7/00* (2017.01)
*G06T 7/11* (2017.01)
*G06T 7/143* (2017.01)
*G06T 7/174* (2017.01)

(52) U.S. Cl.
CPC ............. *G06T 7/0012* (2013.01); *G06T 7/11* (2017.01); *G06T 7/143* (2017.01); *G06T 7/174* (2017.01)

(58) Field of Classification Search
None
See application file for complete search history.

(56) References Cited

U.S. PATENT DOCUMENTS 11,322,232 B2 * 5/2022 Lyman ................ G06F 18/2415
2013/0251194 A1 * 9/2013 Schamp ................... G06T 7/11
                                                    382/199
2020/0085382 A1 * 3/2020 Taerum ................. A61B 6/563
2022/0338805 A1   10/2022 Jeraj et al.

OTHER PUBLICATIONS

Chitphakdithai, Nicha, Veronica L. Chiang, and James S. Duncan. "Tracking metastatic brain tumors in longitudinal scans via joint image registration and labeling." Berlin, Heidelberg: Springer Berlin Heidelberg, 2012. (Year: 2012).*
Oguz, Ipek, et al. "Dice overlap measures for objects of unknown number application to lesion segmentation." International MICCAI Brainlesion Workshop. Cham: Springer International Publishing, 2017. (Year: 2017).*
Hering et al.; "Whole-Body Soft-Tissue Lesion Tracking and Segmentation in Longitudinal CT Imaging Studies"; Proceedings of Machine Learning Research; 143; Jul. 2021, pp. 312-326.

* cited by examiner

*Primary Examiner* — Matthew C Bella
*Assistant Examiner* — Johnny B Duong

(57) ABSTRACT

Disclosed herein is a system for linking images of a lesion taken over different periods of time comprising an imaging device that is operative to image one or more lesions present in a living being. The imaging device takes a first image at a first point in time $T_1$ and a second image at a second point in time $T_2$. A microprocessor is operative to receive the first image and the second image and to perform an adaptive search on the respective images. The adaptive search comprises selecting a first voxel in a first lesion in the first image and radially searching for one or more second lesions in the second image that share one or more overlapping first voxels with the first lesion in the first image. A probability is assigned if there is an overlap between the first lesion and one or more second lesions. Each voxel in the first lesion based on the probability.

21 Claims, 6 Drawing Sheets

100

6000

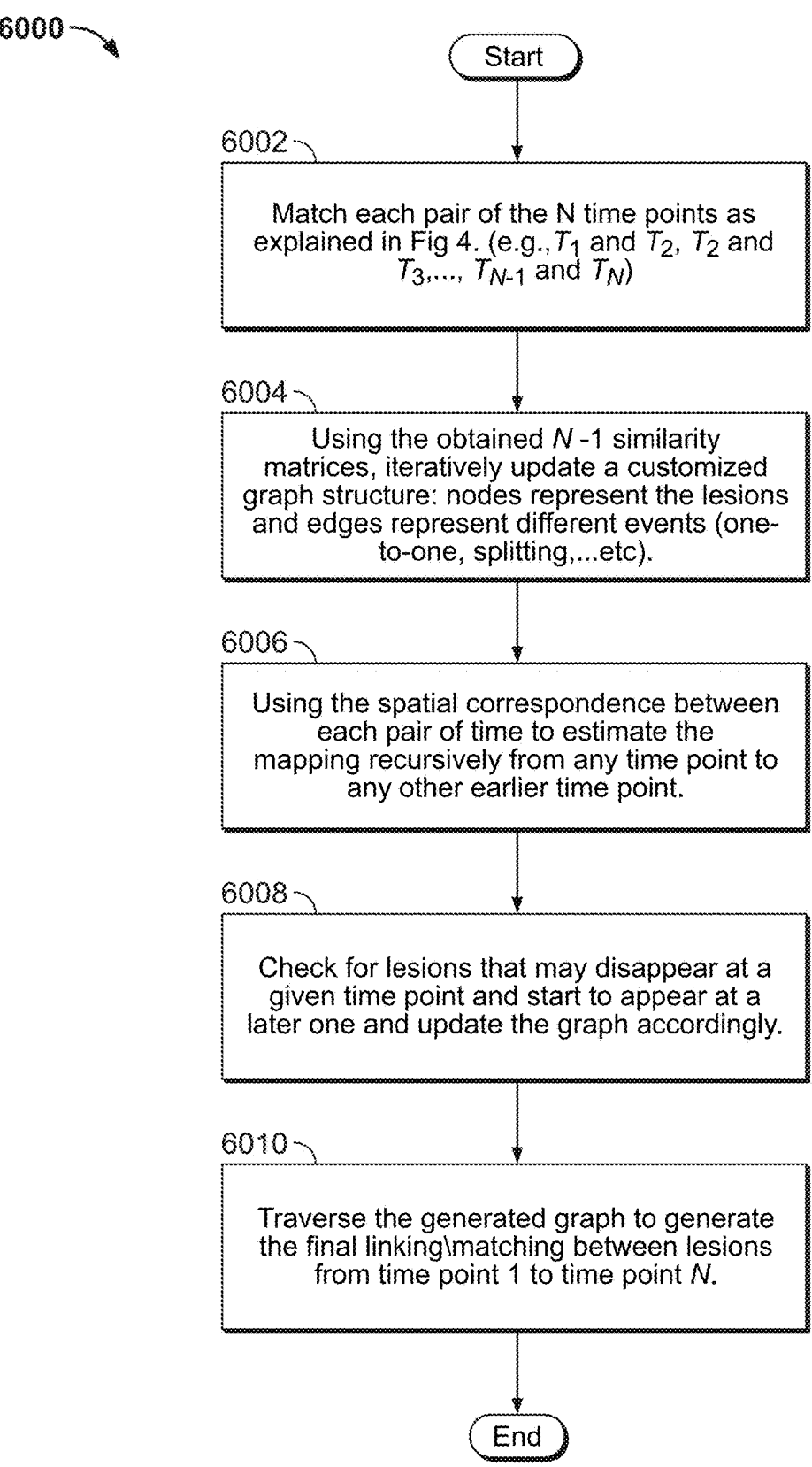

Start

6002

Match each pair of the N time points as explained in Fig 4. (e.g., $T_1$ and $T_2$, $T_2$ and $T_3$,..., $T_{N-1}$ and $T_N$)

6004

Using the obtained $N$ -1 similarity matrices, iteratively update a customized graph structure: nodes represent the lesions and edges represent different events (one-to-one, splitting,...etc).

6006

Using the spatial correspondence between each pair of time to estimate the mapping recursively from any time point to any other earlier time point.

6008

Check for lesions that may disappear at a given time point and start to appear at a later one and update the graph accordingly.

6010

Traverse the generated graph to generate the final linking\matching between lesions from time point 1 to time point $N$.

End

FIG. 5

LESION LINKING USING ADAPTIVE SEARCH AND A SYSTEM FOR IMPLEMENTING THE SAME

BACKGROUND

This disclosure relates to lesion linking using adaptive search. More specifically, this disclosure relates to linking lesions that are imaged at different points in time.

The growth of malignant lesions is not easily controlled. They can therefore spread locally as well as to distant portions of the body. They travel via the bloodstream or the lymphatic system to create new lesions. Each lesion within the same patient may respond differently to treatment or have a different growth pattern. Therefore, lesion-level assessment is desirable for a complete understanding of disease response and better treatment management. However, lesion-level assessment is particularly difficult especially in cases with many corresponding lesions and might require a manual matching, which is a tedious, time-consuming, subjective, and an error-prone task.

Medical imaging, such as magnetic resonance imaging (MRI), computed tomography (CT), positron emission tomography (PET) or single-photon emission computed tomography (SPECT) is an important tool for identifying malignant lesions and monitoring their response to treatment.

The radiological interpretation of PET/CT scans referred for oncology may involve the segmentation of a large number of findings that are suspicious for cancer. Longitudinal PET/CT scans are routinely performed to assess disease progression and/or response to therapy. While algorithms exist to segment lesions at individual points in time, there are no methods that robustly link lesions across points in time.

It is therefore desirable to develop methods by which the tracking of lesions based on their origination and propagation can be conducted.

SUMMARY

Disclosed herein is a system for linking images of a lesion taken over different periods of time comprising an imaging device that is operative to image one or more lesions present in a living being; where the imaging device takes a first image at a first point in time $T_1$ and a second image at a second point in time $T_2$; a microprocessor that is operative to receive the first image and the second image and to perform an adaptive search on the respective images; where the adaptive search comprises selecting a first voxel in a first lesion in the first image; radially searching for one or more second lesions in the second image that share one or more overlapping first voxels with the first lesion in the first image; where the radial search is conducted continuously using progressively increasing radii upto a maximum radial threshold value T; and where if no overlap is found upon reaching the threshold value r, then there is no correspondence between the first lesion and the one or more second lesions; or if an overlap between the first lesion and one or more second lesions is found, then a determination is made as to the number of first voxels that can fit into each overlapping volume between the first lesion and the one or more second lesions; and determining a probability based on a ratio of first voxels that fit into each overlapping volume between the first lesion and each one of the one or more second lesions; where the probability is calculated by dividing the number of first voxels present in each overlapping volume divided by the total number of first voxels in all overlapping volumes between the first lesion and the one or more second lesions; and labelling each voxel in the first lesion based on the probability.

Disclosed herein too is a method for linking lesions that are imaged at different time periods comprising taking a first image at a first point in time $T_1$ of one or more lesions present in a living being; taking a second image at a second point in time $T_2$ the one or more lesions; performing an adaptive search on the first image and the second image; where the adaptive search comprises selecting a first voxel in a first lesion in the first image; radially searching for one or more second lesions in the second image that share one or more overlapping first voxels with the first lesion in the first image; where the radial search is conducted continuously using progressively increasing radii upto a maximum radial threshold value T; and where if no overlap is found upon reaching the threshold value r, then there is no correspondence between the first lesion and the one or more second lesions; or if an overlap between the first lesion and one or more second lesions is found, then a determination is made as to the number of first voxels that can fit into each overlapping volume between the first lesion and the one or more second lesions; and determining a probability based on a ratio of first voxels that fit into each overlapping volume between the first lesion and each one of the one or more second lesions; where the probability is calculated by dividing the number of first voxels present in each overlapping volume divided by the total number of first voxels in all overlapping volumes between the first lesion and the one or more second lesions; and labelling each voxel in the first lesion based on the probability.

BRIEF DESCRIPTION OF THE FIGURES

FIG. 5 depicts a lesion mapping process for a plurality of images obtained at different times from $T_1$ to $T_n$.

DETAILED DESCRIPTION

Definitions

Figure 1:
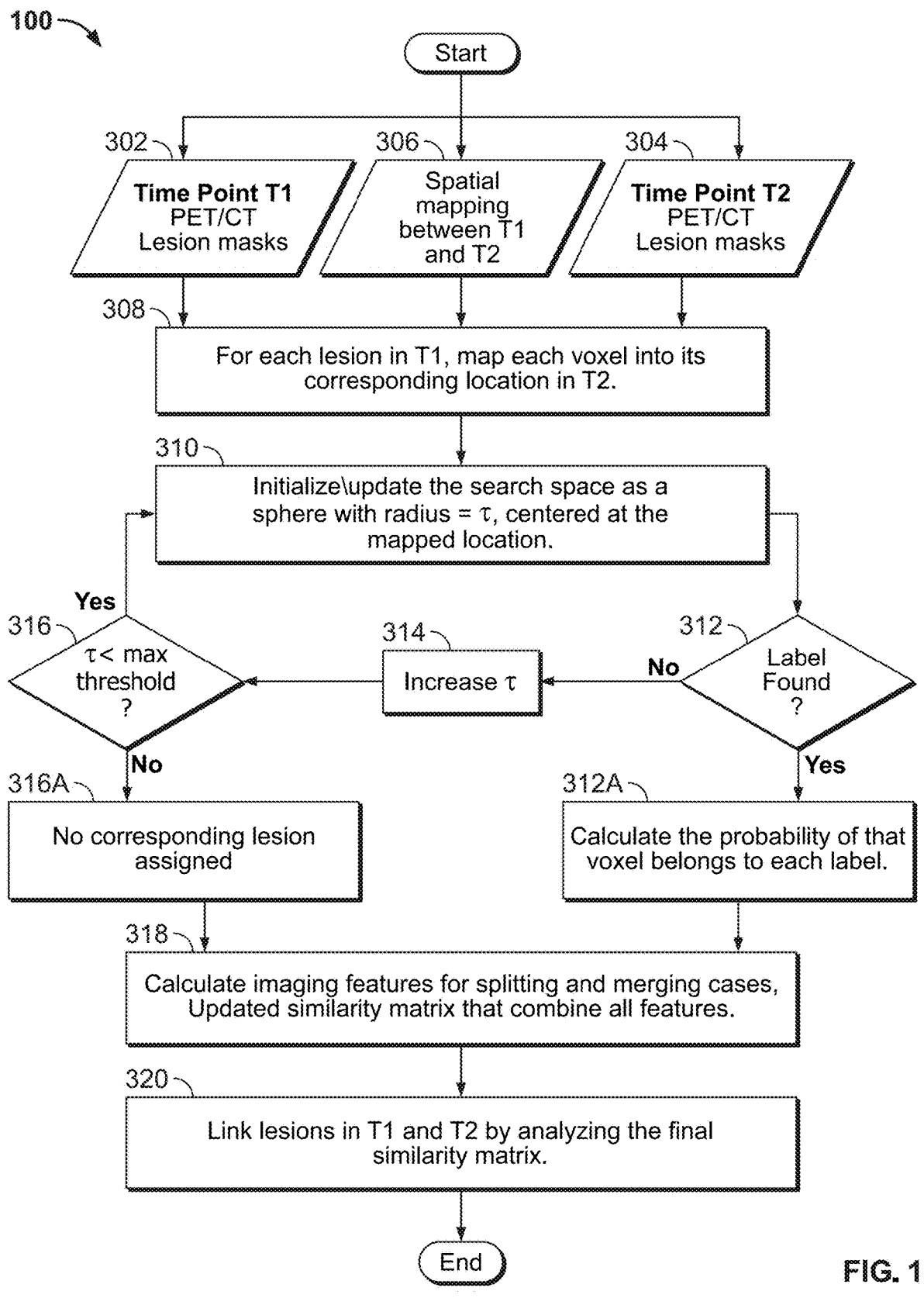
FIG. 1 is a schematic depiction of a method that details the lesion matching process.

An adaptive search algorithm is a metaheuristic algorithm that is applied to a combinatorial optimization problem. It comprises iterations made up from successive constructions of a randomized solution and subsequent iterative improvements of it through a local search. The randomized solutions are generated by adding elements to the problem's solution set from a list of elements ranked by a greedy function according to the quality of the solution they will achieve. A greedy algorithm is an approach for solving a problem by selecting the best option available at the moment. It does not concern itself as to whether the current best result will bring about an overall optimal result.

An adaptive search algorithm computes an overlap between voxels in one or more lesions imaged at time point 2 ($T_2$) and those voxels in a lesion imaged at time point 1 ($T_1$) and this overlap is used to calculate a probability, which is then used to assign one label to those particular voxels. Each lesion imaged at time point $T_2$ have a unique label, e.g., 1, 2, ..., N. All voxels of the lesion imaged at $T_1$ get labeled based on this probability.

Lesion masking involves creating a layer that covers the lesion (and only the lesion). Lesions are often masked manually. Lesion masks are sometimes referred to as lesion maps or as segmentations.

A voxel is a 3D cube that can be used to create 3D models. It is similar to a pixel in a 2D image, but it has an additional dimension (Z) that allows it to have depth. A voxel may have a specific location in a 3D grid and a color value (or a characteristic property) assigned to it. By combining multiple voxels with different characteristic properties and positions, complex shapes and objects may be created. Examples of characteristic properties are geometric, functional or structural features.

Image registration is a tool that facilitates spatial mapping of the voxels so that it (the mapping) can be used in the adaptive search to get the adaptive overlap that will be used in lesion linking process.

Image alignment refers to the process of overlaying or matching corresponding features of two or more images to bring them into a common reference frame. It is commonly used in image processing and computer vision tasks such as image stitching, object recognition, and 3D reconstruction.

Disclosed herein is a system and a method for performing adaptive searches to track lesion development of a plurality of N lesions across a plurality of successive points in time, $T_1, T_2, T_3, \ldots, T_{n-1}, T_n$, where $T_n > T_{n-1}, \ldots$, where $T_3 > T_2$ and $T_2 > T_1$, where N and n are both integers that have values of 1 or greater. The method accurately links lesions between successive longitudinal PET/CT image scans conducted on a single patient over a period of time. In an embodiment, the adaptive search for the N lesions are conducted at different successive time intervals and the information derived therefrom may be integrated with information derived from other sources such as CT and PET images e.g., radiomics information (e.g., texture of the lesions); geometric information (e.g., size and shape of the lesions); quantitative information (e.g., increase or decrease in the number of lesions); functional information (e.g., how the lesion responds to treatment); structural information (e.g., does it impinge on nearby structures, is it a non-space occupying lesion), or the like.

In an embodiment, the overlap obtained from adaptive searches may be layered with information pertaining to PSMA (Prostate-Specific Membrane Antigen) and FDG (Fluorodeoxyglucose) mismatch for radionuclide therapy selection. This involves evaluating the suitability of using specific radiotracers for targeted therapy in patients with prostate cancer. PSMA-targeted radionuclide therapy and FDG PET/CT are two different types of imaging and therapy approaches used in the management of prostate cancer. PSMA-targeted radionuclide therapy utilizes radiolabeled small molecules that target PSMA, which is highly expressed on the surface of prostate cancer cells. This approach allows for the selective delivery of radiation to the cancer cells while sparing surrounding healthy tissues. On the other hand, FDG PET/CT is a diagnostic imaging technique that uses a radioactive tracer to visualize the metabolic activity of cells, often used for cancer staging and detection of metastases.

In an embodiment, the method comprises adding additional layers pertaining to image based information and/or non-imaged based information to the first and second images in multi-tracer studies to determine the mismatch for radionuclide therapy selection. In an embodiment, the multitracer studies include using PSMA and FDG amongst others. Assessing the PSMA and FDG mismatch involves analyzing the expression of PSMA and the metabolic activity of tumors using FDG PET/CT. This assessment helps in determining whether PSMA-targeted radionuclide therapy or FDG PET/CT would be more suitable for a particular patient. The aim is to identify patients who are more likely to benefit from PSMA-targeted therapy based on the presence of PSMA-positive tumors and minimal FDG uptake, indicating a favorable PSMA-FDG mismatch.

By assessing this mismatch, clinicians can make more informed decisions regarding the selection of the most appropriate treatment modality for individual patients. This personalized approach can lead to improved treatment outcomes and better management of prostate cancer, ultimately enhancing patient care and quality of life.

The information obtained from the adaptive search disclosed herein can also be integrated with other non-image based information derived from other techniques such as, for example liquid biopsies (which provide information for detecting the functional molecular properties of a tumor or a disease by comprehensive and quantitative molecular analysis of the patient's fluid sample (mostly blood plasma), from circulating-free tumor deoxyribonucleic acid (ctDNA), or circulating-free tumor ribonucleic acid (ctRNA), or both (circulating-free tumor total nucleic acids, ctNA). In an embodiment, the adaptive search results can be validated and verified by medical professionals to ensure the accuracy of the matched cancerous lesions.

Similarity matrices may be created linking the different behaviors of different lesions that are generated or that disappear with the same or different treatments (appearing, disappearing, merging, splitting, ..., or the like). Encoding of lesions from N time points using a customized data structure and linking the interaction between the lesions using the obtained N−1 similarity matrices is obtained by matching each pair of the N time points.

This method can also be used in multi-tracer studies to assess the concordance or discordance of lesions. Concordance and discordance of lesions refer to the agreement or disagreement between different diagnostic tests, imaging modalities, or observers in the identification and characterization of lesions, typically in the context of medical imaging and diagnosis. Concordance of lesions implies that multiple diagnostic tests or imaging modalities, or different observers, produce consistent results, indicating a high level of agreement in the identification and characterization of lesions. High concordance suggests that the findings are reliable and that the lesions are accurately identified and classified.

Manual linking of lesions and lesion-level disease analysis is challenging and impractical in daily clinical practice, especially for challenging cases with a lot of lesions that merge or split over time. The challenges include identifying an anatomical spatial correspondence between successive PET/CT studies where there may be significant differences between patient position or body habitus. There are a variety of conditions to consider since lesions may have appeared, disappeared, changed shape, grown, shrunk, split into multiple parts, or merged with adjacent lesions.

FIG. 1 is a schematic depiction of a method 100 that details the lesion matching process. The method comprises imaging a region of a patient that contains one or more lesions at several different points in time ($T_1$, $T_2$, $T_3$, . . . , $T_{n-1}$, $T_n$) and developing a spatial correspondence between the images of the lesions taken at the different times. Spatial correspondence refers to the matching of corresponding points in two or more images. In step 302, a region containing a lesion is selected and a first image is obtained at time $T_1$. In step 304, at time $T_2$, where $T_2$ is greater than $T_1$, a second image is obtained. The lesion masking used for the image obtained at time $T_1$ may also be used for the image taken at time $T_2$. All images (the first image, the second image, and so on) may be obtained using positron emission tomography (PET)/computed tomography (CT), magnetic resonance imaging (MRI), single-photon emission computed tomography (SPECT), or the like, or a combination thereof. In an embodiment, all images obtained at different times $T_1$, $T_2$, $T_3$, . . . , $T_{n-1}$, $T_n$ are conducted using a single imaging device (e.g., positron emission tomography/computed tomography). The single imaging device used at different times $T_1$, $T_2$, $T_3$, . . . , $T_{n-1}$, $T_n$ can each be provided by a different manufacturer. In an embodiment, the single imaging device can generate more than one imaging modality, such as for example, PET and CT or MRI and CT. In other words, if the first image taken at time $T_1$ is obtained using positron emission tomography/computed tomography, then all subsequent images used for the image linking process are also obtained using positron emission tomography/computed tomography. In this particular example, information from other images such as MRI, SPECT, liquid biopsies, and so on may be layered onto the images derived from the positron emission tomography/computed tomography to generate a more accurate linkage between images over time and also to classify lesions more accurately.

In step 306 spatial mapping may be conducted to link one or more lesions in the first image taken at $T_1$ with those in the second image taken at time $T_2$. It is to be noted that spatial mapping is not just conducted between images obtained at times $T_1$ and $T_2$ (as enunciated in the FIG. 1), but as will be detailed later may be used to link lesions that are imaged over a plurality of times $T_1$, $T_2$, $T_3$, . . . , $T_{n-1}$, $T_n$. Spatial mapping involves developing a spatial correspondence between images of one or more lesions at different times over the life of the lesion. The spatial mapping is also used to provide a correspondence between the voxels of the first image taken at $T_1$. Over a period of time, a particular single lesion may continue to grow in size, change shape, split up into several lesions, merge with other lesions or shrink and disappear due to therapeutic treatments.

With reference now again to FIG. 1, there are several methods by which lesions imaged at time $T_1$ may be linked (spatially mapped) to those imaged at time $T_2$. These are broadly classified as step 308 in the FIG. 1. In one embodiment, spatial mapping may be conducted via mask matching (which is detailed below). In another embodiment, spatial mapping may be conducted via image alignment (where images obtained at different times $T_1$, $T_2$, $T_3$, . . . , $T_{n-1}$, $T_n$ are all arranged to have the same coordinates) and conducting sequential searches in 3D space with radii of different sizes (upto a threshold maximum radius of t) using a voxel in the lesion (the selected voxel is termed a "labelled voxel") as the pivoting point for the radius. The labelled voxel has the characteristics that are being searched for. The labelled voxel may be located at any position in lesion seen in an image taken at time $T_1$.

In an embodiment, the labelled voxel is located at the centroid of at least one lesion imaged at time $T_1$. This relates to step 310 in the FIG. 1. The successive searches with radii of different sizes are conducted up to a threshold maximum radius of r, where the maximum threshold value of T is greater than the largest voxel size. If a voxel having similar characteristics as the labelled voxel is detected in an overlapping lesion during the search of an image at time $T_2$, then a determination is made as to the number of that particular labelled voxels that can fit into the overlapping region. A probabilistic determination is made as to whether it corresponds to the lesion seen in the preceding image (see steps 312 and 312A in the FIG. 1) at time $T_1$. If no voxels having similar characteristics to the labelled voxel are detected, then successive searches are conducted with radii of ever increasing size till the maximum threshold radius T is reached (see steps 314 and 316). If no voxels having similar characteristics to the labelled voxel are found despite reaching the maximum threshold radius r, then no correspondence is established between the labeled voxel imaged at time $T_1$ and subsequent images obtained at times $T_2$, $T_3$, . . . , $T_{n-1}$ and $T_n$. For the lesions that are detected in step 312A, imaging features for merging and splitting lesions are calculated (see step 318) and a similarity matrix that determines lesion linking between images taken at different times $T_1$, $T_2$, $T_3$, . . . , $T_{n-1}$, $T_n$ is developed (see step 320).

In an embodiment, the spatial mapping may be conducted by matching the mask used in the first image at time $T_1$ with an image obtained at time $T_2$ respectively. This corresponds to step 306 in the FIG. 1. Lesion masking may be conducted on the image if desired. Masking is a technique used in image processing to selectively process certain areas of an image while ignoring others. In the context of lesion identification, masking can be used to highlight or isolate specific regions of an image that contain lesions, making them easier to identify and analyze. In generating a lesion mask, certain known features of a particular lesion such as, for example total lesion volume, average lesion size, lesion count, and so on, obtained from reference data sets and simulated data sets may be utilized. Mask modelling may also be conducted to facilitate improved accuracy in lesion masking using regression modelling with either maximum likelihood estimates, mean bias-reduced estimates or spatial Bayesian modelling, where the regression coefficients have a conditional autoregressive model to account for local spatial dependence. Generating an accurate lesion mask is useful in the spatial mapping step 304, which is detailed below. Segmentation software may be used to create an initial lesion mask.

Mask matching is one rapid manner of achieving the results obtained via steps 308, 310, 312 and 312A. In mask matching, a prior mask (e.g., a mask developed for the image obtained at time $T_1$) to exclude irrelevant background regions in the image obtained at time $T_2$. In generating a mask, a co-occurrence region between a support image (the image obtained at $T_{n-1}$) and a query image (the image obtained at $T_n$) is obtained and this may be used as a prior mask to exclude irrelevant background regions. A query image is an image that is being analyzed to identify the presence of lesions. It is compared to a support image that contains known lesions to determine if the query image contains similar lesions. The results are then concatenated (i.e., linked together in a chain or series) and sent to an inference module (with the appropriate software) to facilitate spatial mapping. Mask mapping is also sometimes referred to as template mapping.

Another method of developing a spatial correspondence between images taken at different times involves image alignment using a spatial mapping algorithm. There are two main types of image alignment algorithms: intensity-based and feature-based. Intensity-based methods compare intensity patterns in images via correlation metrics, while feature-based methods find correspondence between image features such as points, lines, and contours. Spatial correspondence can be established by transforming one image to align with another image. The reference frame in the target image is stationary, while the other datasets are transformed to match the target. There are many algorithms available for image alignment and spatial correspondence, including linear transformations, radial basis functions, and large deformation models. Image similarities are broadly used in medical imaging. An image similarity measure quantifies the degree of similarity between intensity patterns in two images. The choice of an image similarity measure depends on the modality of the images to be registered. Common examples of image similarity measures include cross-correlation, mutual information, sum of squared intensity differences, and ratio image uniformity. Mutual information and normalized mutual information are the most popular image similarity measures for registration of multimodality images. Cross-correlation, sum of squared intensity differences and ratio image uniformity are commonly used for registration of images in the same modality.

As noted above, adaptive searching is performed to link lesions over different time periods and this and encompasses steps 308, 310, 312 and 312A in the FIG. 1. Adaptive searching can be conducted using an adaptive search algorithm. An adaptive search algorithm can assign a given probability that each voxel of each lesion imaged at time point 1 ($T_1$) is matched with the voxels in all lesions imaged at time point 2 ($T_2$), where time point $T_2$ is different from time point $T_1$. This is depicted and discussed in the FIGS. 2A and 2B.

Figure 2A:
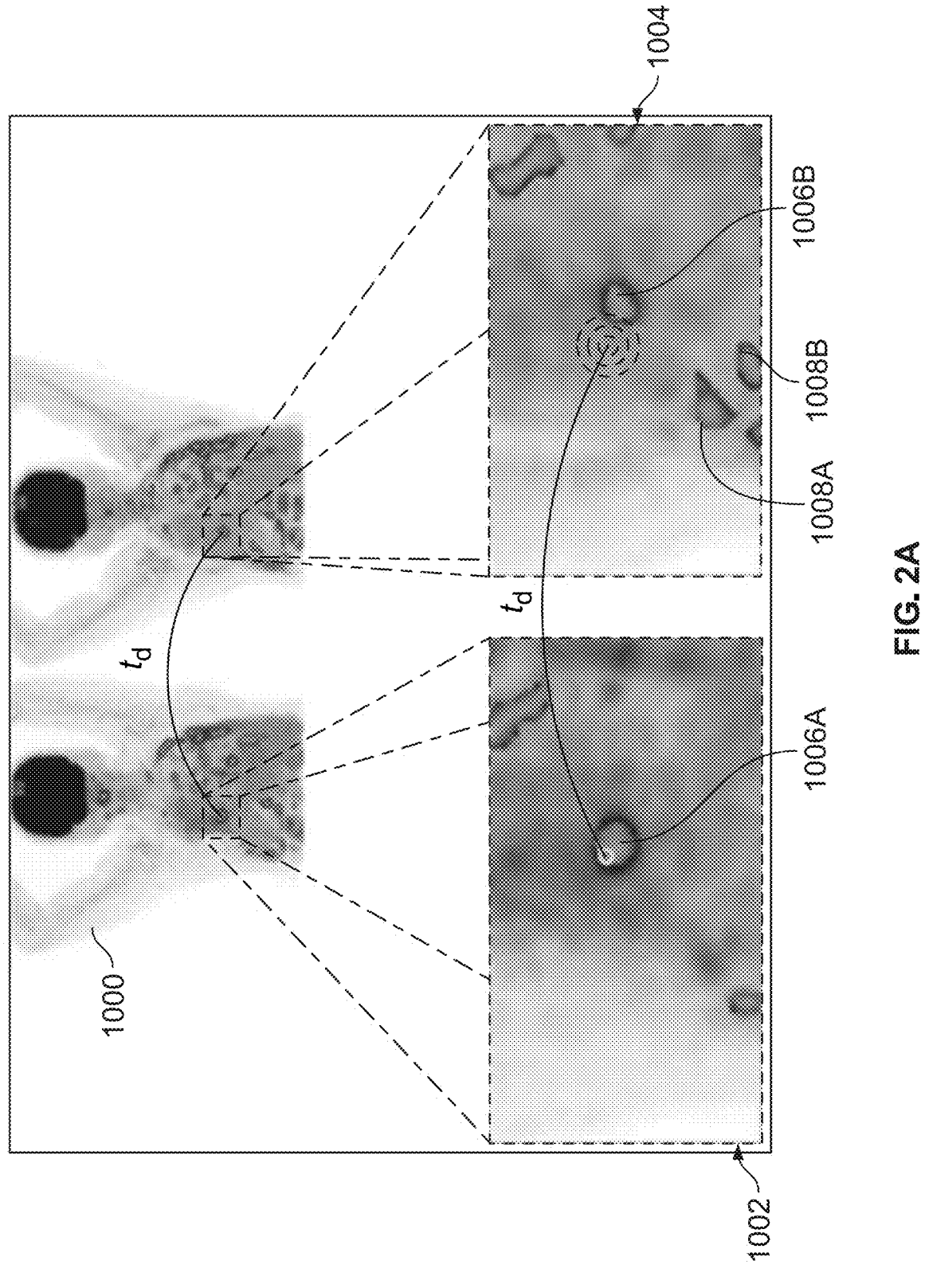
FIG. 2A is a depiction of two images taken at time $T_1$ and $T_2$ that are used to illustrate how an adaptive search is used to match lesions.

FIG. 2A is a depiction of two images taken at time $T_1$ and $T_2$ that are used to illustrate how an adaptive search is used to effect spatial mapping while account for and excluding potential errors. FIG. 2 depicts two images—a first image 1002 and a second image 1004 of a patient 1000 taken at times $T_1$ and $T_2$ respectively. All lesions seen in images 1002 and 1004 are examined and a one-to-one spatial correspondence or spatial mapping for every voxel in at least one the lesions in both of these respective images is established in order to facilitate image alignment. The spatial correspondence for each voxel is indicated as $T_d$. The purpose of $T_d$ is to enable the mapping between any voxel location in $T_1$ image to its corresponding location in $T_2$ image. Spatial correspondence $T_d$ is a term used to describe the process of finding the best match between two images taken at different times ($T_1$ and $T_2$) using a transformation matrix. The transformation matrix is a mathematical representation of how the images are related in terms of rotation, translation, scaling, and skewing. The goal of spatial correspondence $T_d$ is to align the images so that they can be compared or fused for various applications, such as image alignment, image segmentation, image fusion, or image analysis. One way to perform spatial correspondence $T_d$ is to use feature-based methods, which extract salient points or regions from the images and then find the correspondences between them using descriptors or similarity measures. Another way is to use intensity-based methods, which directly compare the pixel values of the images and optimize a cost function that measures the similarity or dissimilarity between them. Both methods use an initial guess or estimation of the transformation matrix, which can be refined iteratively until a satisfactory result is achieved.

Once image alignment is established, an adaptive search process of the image acquired at time $T_2$ is initiated to determine if other lesions present in the image taken at time $T_2$ bear some correspondence with the lesion in the image taken at time $T_1$. In an embodiment, the search may be conducted via a scalar search. The scalar search comprises conducting a radial search in 3-dimensions for other voxels present in image taken at time $T_2$ using a labelled voxel (also called a first voxel) in a first lesion (in the first image 1002 imaged at $T_1$) as the pivot point for the radius. In an embodiment, the search radius is centered at a point in the second lesion (in the second image 1004) that corresponds to location of the first voxel in the first lesion (in the first image 1002). The initial radius that is used in the search is the size of one voxel (e.g., for example, it can correspond to the size of the first voxel in the first image 1002 taken at $T_1$). The radius has only magnitude (i.e., an initial radial size of one voxel), but no direction (i.e., characteristic properties) associated with it. If a second voxel (having the characteristics of the first voxel) is located in the second image 1004 at time $T_2$ during the scalar search, then a second analysis is conducted as to whether the discovered second voxel (in the second lesion in the second image) has characteristics that correspond to the labelled voxel (the first voxel) of the first lesion imaged at time $T_1$. If no such voxel is located, the then successive searches are conducted using radii of increasing sizes till a threshold radius size of T is reached. If no voxels are discovered in all of the successive searches, then there is no correspondence between the lesion imaged at time $T_1$ and the lesion in the image at time $T_2$.

As noted above, if a voxel is discovered in the second image, then it is analyzed for characteristics of the labelled voxel in the first image. If there is a correspondence between the characteristics of the voxel imaged at $T_2$ and the labelled voxel at $T_1$, then a probabilistic determination is made that the voxel image at $T_2$ (and hence the lesion in the second image 1004) does indeed correspond to the labelled voxel (and hence the lesion) from the first image 1002 taken at $T_1$. The probabilistic determination includes determining characteristics (of the second lesion) that include geometry, structure and/or function and to determine if these characteristics correspond to those of the first lesion.

In summary, a scalar search involves two steps—the first step in the search process involves a determination of the presence of new lesions at time $T_2$ in addition to the lesions that were present at time $T_1$. The second step in the process is to determine if the new lesions found at time $T_2$ correspond to characteristics of any of the lesions seen in the image at time $T_1$. Any lesions (with the desired characteristics) found at time $T_2$ are then spatially mapped to the lesion seen in the image at time $T_1$. In this manner, a linkage may be made between a plurality of images taken at times $T_1$, $T_2$, $T_3$, . . . , $T_{n-1}$, through to $T_n$. The linkage between lesions made via a plurality of images taken at times $T_1$, $T_2$, $T_3$, . . . , $T_{n-1}$, through to $T_n$ may be brought about by a similarity matrix which is detailed below.

In another embodiment, after image alignment, the spatial mapping may be conducted with a vector search. Vector searches may use less time than scalar searches because they may involve only a single step—that for the search. This is because the vector involved in the radial search has appended to it both magnitude (e.g., an initial radius of 1 voxel) and direction (e.g., characteristics of the labelled voxel such a lesion volume, lesion geometry, or the like). In order to use a vector search, the image obtained from an imaging device such as a PET/CT may be appended with relevant characteristics based on geometry, structure and/or function. Since the image has both magnitude and directional characteristics, it can be subjected to a vector search.

A vector search is a type of search that uses vectors to represent images. Vectors are mathematical representations of images that can be used to compare images and find similarities between them. In a vector search, an image is represented as a vector, and then compared to other vectors to find similar images. Linkage between several images (taken at different times) can be brought about by comparing the distances and similarities between vectors.

In a vector search, the initial search vector combines a magnitude component (e.g., the radius of the labelled voxel) with a directional component (e.g., one or more characteristics (e.g., geometric, functional or structural) of the labelled voxel in the lesion imaged at time $T_1$). A search is conducted for other vectors in the image at time $T_2$ that have the characteristic properties of the search vector. The voxel whose voxel radius and characteristic properties are being searched is typically termed the "labelled voxel". It may be located anywhere in a lesion imaged at time $T_1$. The vector search radius generally pivots about the labelled voxel located in a lesion imaged at time $T_1$. In an embodiment, the labelled voxel is located at the centroid of a lesion imaged at time $T_1$ and the vector search radius pivots about the center of the labelled voxel located at the centroid of the lesion. If no other identical vectors are identified in the initial search, then the search vector radius (that is a combination of voxel size and characteristic properties) is successively increased till a maximum predefined threshold T for vector size is reached.

If during the search, another vector in the image taken at time $T_2$ is determined to have substantially similar characteristic properties as the vector (that has appended size and characteristics of the labelled voxel), then a probabilistic determination is made as to whether this vector corresponds to a lesion seen in the image at time $T_1$. Similarity matrices may also be created in the case of a vector search and linkage between images taken at a plurality of times $T_1$ through to $T_n$ may be achieved.

Figure 2B:
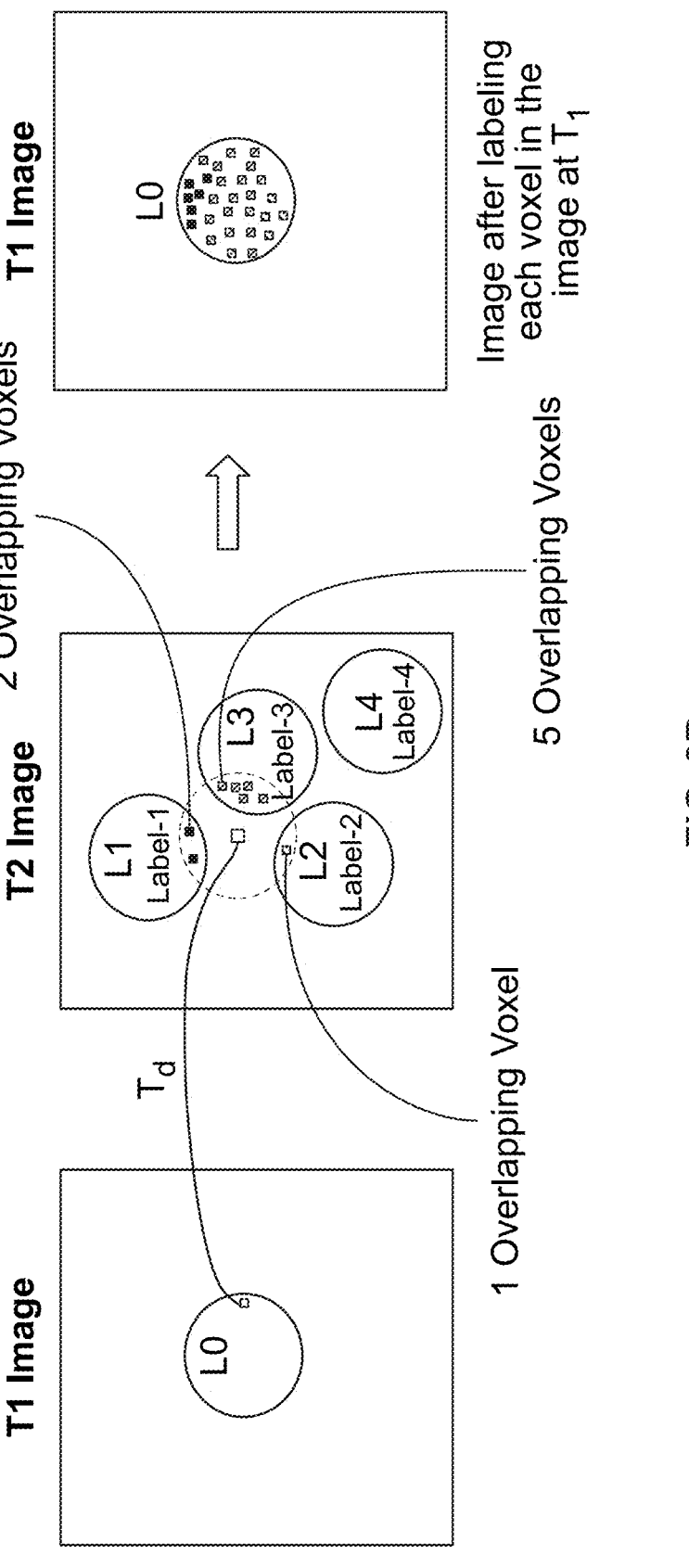
FIG. 2B is a depiction of an exemplary method for determining overlap between voxels in lesions imaged at times $T_1$ and $T_2$.

The different types of searches detailed above may be exemplified by the examples provided in the FIGS. 2A and 2B. An explanation of image registration and correspondence mapping of lesions imaged at different times (using a scalar search) will now be explained with reference to images in the FIGS. 2A and 2B. FIG. 2A details the adaptive search process where each voxel in a lesion imaged at $T_1$ is assigned a unique label (based on the highest probability), or none if the search process does not locate any voxels that match the voxel with the unique label. As detailed above, image registration is a tool that facilitates spatial mapping of the voxels so that it (the mapping) can be used in the adaptive search to get the adaptive overlap that will be used in lesion linking process.

As noted above, FIG. 2A depicts two images—the first image 1002 and the second image 1004 of a patient 1000 taken at times $T_1$ and $T_2$ respectively. For example, with reference to image 1002 in FIG. 2A, a lesion 1006A is imaged in a PET/CT scan taken at time $T_1$. While there are other lesions in the image 1002, only lesion 1006A will be focused on for this discussion. The PET/CT scan image 1004 taken at time $T_2$ shows other lesions 1008A and 1008B in addition to the lesion 1006B. As a first step, if the voxels (all or some of them) in the lesion 1006A can be matched only with voxels in the lesion 1006B (they will have a one-to-one correspondence and no further analysis is conducted).

The process is initiated by applying spatial mapping (or transformation) that was obtained by image registration—or any other method—for every voxel in each lesion. After applying the transformation for a given voxel location in lesion 1006A, it will be mapped to a location in $T_2$ and then a search process is started (as explained before) to get the probability that a labeled voxel belonging to lesion 1006A will overlap with a voxel present in lesion 1006B.

If the voxels (all or some of them) in lesion 1006A match only voxels in the lesion 1006B, it is a ono-to-one correspondence and no further analysis (using other features later in the analysis and construction of similarity matrix) is desired for that lesion. The additional analysis is established for lesions that overlap (based on adaptive search) with more than one lesion.

Once image registration has been established, other new lesions in the proximity of lesion 1006B can be searched and examined for a labeled voxel that is similar to the labeled voxel of lesion 1006A. In other words, a lesion such as 1006B that is used in the image registration is excluded from the further searching that is conducted to determine if there are other lesions present at time $T_2$ that have the voxel characteristics of lesion 1006A.

If another lesion overlaps with lesion 1006B from image 1004 taken at $T_2$, and the lesion (that overlaps with lesion 1006B) contains one or more labeled voxels identical with the labeled voxel from 1006A in image 1002 (taken at $T_1$), then a probability is calculated for that voxel based on the sum of overlapping voxels seen in all overlapping lesions (that overlap with lesion 1006B). This methodology is detailed in the FIG. 2B. The FIG. 2B details how a lesion imaged at time $T_1$ may be linked to other overlapping lesions imaged at time $T_2$.

As with FIG. 2A, FIB. 2B depicts two images (one obtained at $T_1$ and the other at $T_2$) with the lesions and a spatial correspondence $T_d$ (which as detailed above can be obtained using image registration, point matching, or any other technique) that is estimated as an initial step. With reference now to the FIG. 2B, the total number of overlapping voxels between the lesion imaged at $T_1$ is then computed for all the overlapping lesions (that overlap with the lesion imaged at $T_1$) imaged at $T_2$. Probabilities for each of the voxels seen in the different overlapping lesions are calculated by ratioing the voxel seen in a particular overlapping lesion with the total number of overlapping voxels. These probabilities are then used to assign the overlap between the lesion imaged at $T_1$ with those imaged at $T_2$. (See steps 312 and 312A in the FIG. 1) This method can be repeated continuously for every subsequent image obtained at times $T_3, T_4, \ldots, T_{n-1}, T_n$. In other words, the image taken at time $T_3$ may be related to the image taken at $T_2$ (again by examining overlapping voxels), the image taken at $T_4$ may be related to the image taken at $T_3$, and so on up to the point at which an image taken at time $T_n$ may be related to the image taken at time $T_{n-1}$. The volume of overlap (based on the number of voxels for each lesion), is used in the construction of one feature in the similarity matrix (which is detailed below). Further analysis is conducted to detail whether the lesions are splitting, merging, disappearing, and so on as it detailed below.

For example, in the FIG. 2B, the search space is the shown region inside the dotted circle with the number of found voxels for each label. A lesion $L_0$ is seen in the image at time $T_1$, while at time $T2$, there are four more lesions $L_1, L_2, L_3$ and $L_4$, in addition to the original lesion $L_0$ seen at $T_1$. Each lesion imaged at time $T_2$ is assigned an identity (e.g., $L_1, L_2, L_3$ and $L_4$). After the lesion $L_0$ imaged at time $T_2$ (shown in the dotted circle) is registered via spatial correspondence $T_d$ to the lesion $L_0$ at time $T_1$, the number of overlapping voxels between the lesion $L_0$ and lesions $L_1, L_2, L_3$ and $L_4$ is examined. From FIG. 2B, it may be seen that there are two overlapping voxels between $L_0$ and $L_1$, 5 overlapping voxels between $L_0$ and $L_3$ and 1 overlapping voxel between $L_0$ and $L_2$. There are no overlapping voxels between $L_0$ and $L_4$.

The probabilities of the voxel (v) to belong to each of the three labels at time $T_2$ can be calculated as follows (number of voxels per each label/total number of voxels):

$$P(v = L_1) = 2/(1 + 2 + 5) = 0.25$$

$$P(v = L_2) = 1/(1 + 2 + 5) = 0.125$$

$$P(v = L_3) = 5/(1 + 2 + 5) = 0.625$$

$$P(v = L_4) = 0/(1 + 2 + 5) = 0.0$$

Based on the probability of overlap, the similarity or linkage between lesions may be calculated. After repeating the above process for all voxels in lesion $L_0$, the final result will be as shown in diagram of the image to the right hand side of the arrow which represents the overlap between $L_0$ and other lesions in $T_2$. In other words, each voxel in the lesion $L_0$ is labelled based on the probability obtained from the number of overlapping voxels with each lesion ($L_1$, $L_2$, $L_3$ and $L_4$) seen in the image at $T_2$. The volume of overlap (based on voxel contribution per label), is used in the construction of one feature in the similarity matrix and further analysis to get the splitting, merging, and the like.

The search process detailed above is conducted for each voxel within each lesion. The adaptive search described above can be sequentially or simultaneously conducted to link multiple lesions seen in the image taken at time $T_2$ with lesions seen in an image taken at time $T_1$. In an embodiment, multiple searches can be simultaneously or sequentially conducted (on an image taken at time $T_n$) on a plurality of different first lesions imaged at time $T_1$ (each of which have a labeled voxel) which overlap with a plurality of overlapping second lesions imaged at time $T_2$, each of which have the same labelled voxel in an overlapping region.

In an embodiment, a search is conducted for each voxel within each lesion. In other words, if there are N different lesions present in an image at time $T_{n-1}$ each having m different voxel characteristics, then m(N−1) different searches (each with the same or a different labeled voxel) can be sequentially or simultaneously conducted on any subsequent image $T_n$ for purposes of spatial mapping.

A similarity matrix is generated after finishing the adaptive search for each voxel and assigning that voxel a unique label. Based on that, the overlap (which is one feature of the similarity matrix) can be calculated between lesions. Other components of the similarity matrix can be imaging features (e.g., structural features, functional features, geometric features, and the like) In this manner, a similarity matrix can be generated between a plurality of lesions present in the image taken at time $T_n$ with the plurality of lesions observed in the image taken at time $T_{n-1}$. In another embodiment N−1 adaptive searches may be simultaneously or sequentially conducted on different lesions present in an $N^{th}$ image taken at time $T_n$; where N and n are both integers of 1 or greater. In an embodiment, n is 2 or greater.

Figure 3:
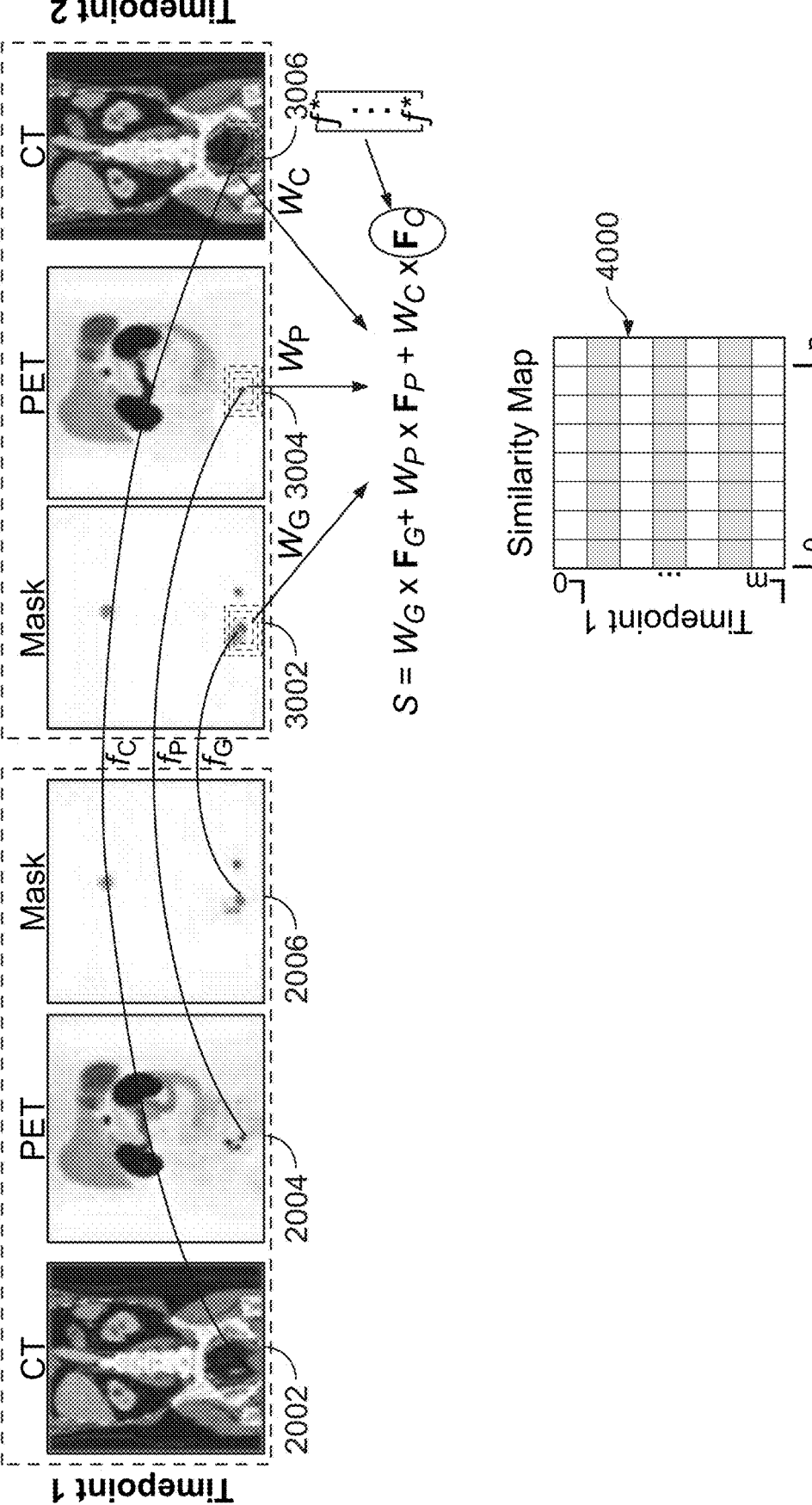
FIG. 3 depicts a similarity map of all lesions present in images taken at times $T_1$ and $T_2$.

FIG. 3 depicts an exemplary embodiment of one method for forming a similarity map or matrix. A similarity map is a visualization strategy that helps to represent the similarities in the image (and other characteristics) for lesions that are imaged at different times. It may be used to visualize the origins of lesion similarity between different lesions that are imaged at different times. In geometry, two objects are similar if they have the same shape, or if one has the same shape as the mirror image of the other. More precisely, one can be obtained from the other by uniformly scaling (also called a weighting factor), possibly with additional translation, rotation, and reflection. In other words, if two objects are similar, each is congruent to the result of a particular uniform scaling (weighting) of the other. This means that either object can be rescaled, repositioned, and reflected so as to coincide precisely with the other object. The FIG. 3 contains images of patient 1000 taken via CT (2002), PET (2004) and the mask (2006) taken at time $T_1$ and again via CT (3006), PET (3004) and the mask (3002) taken at time $T_2$. After image registration and spatial mapping (or spatial correspondence) via the adaptive search algorithm as outlined above, these images along with geometric information may be integrated and be presented as a weighted mixture (also called a similarity score S) as shown in formula (1)

$$S = W_G \times F_G + W_P \times F_P + W_C \times F_C, \qquad (1)$$

where $F_G$, $F_P$, and $F_C$ represent vectors for the geometric, functional and structure based features, while $W_G$, $W_P$, and $W_C$ represent their respective weighting factors. From the formula (1) it may be seen that every specific characteristic obtained from the images is weighted for each contributing modality. In the formula (1), each of the geometric ($F_G$), functional ($F_P$) and structure based vectors ($F_C$) may be dependent upon one or more factors. For example, the structure based vector $F_C$ may be mathematically calculated from a number of different features as represented below in formula (2).

$$F_C = \begin{bmatrix} f_1 \\ f_2 \\ f_3 \\ f_4 \\ \cdot \\ \cdot \\ \cdot \\ f_n \end{bmatrix}, \qquad (2)$$

where $f_1$, $f_2$, $f_3$, $f_4$, ..., $f_n$ are different weighted features that are taken into account in determining the structure based vector $F_C$.

Figure 4:
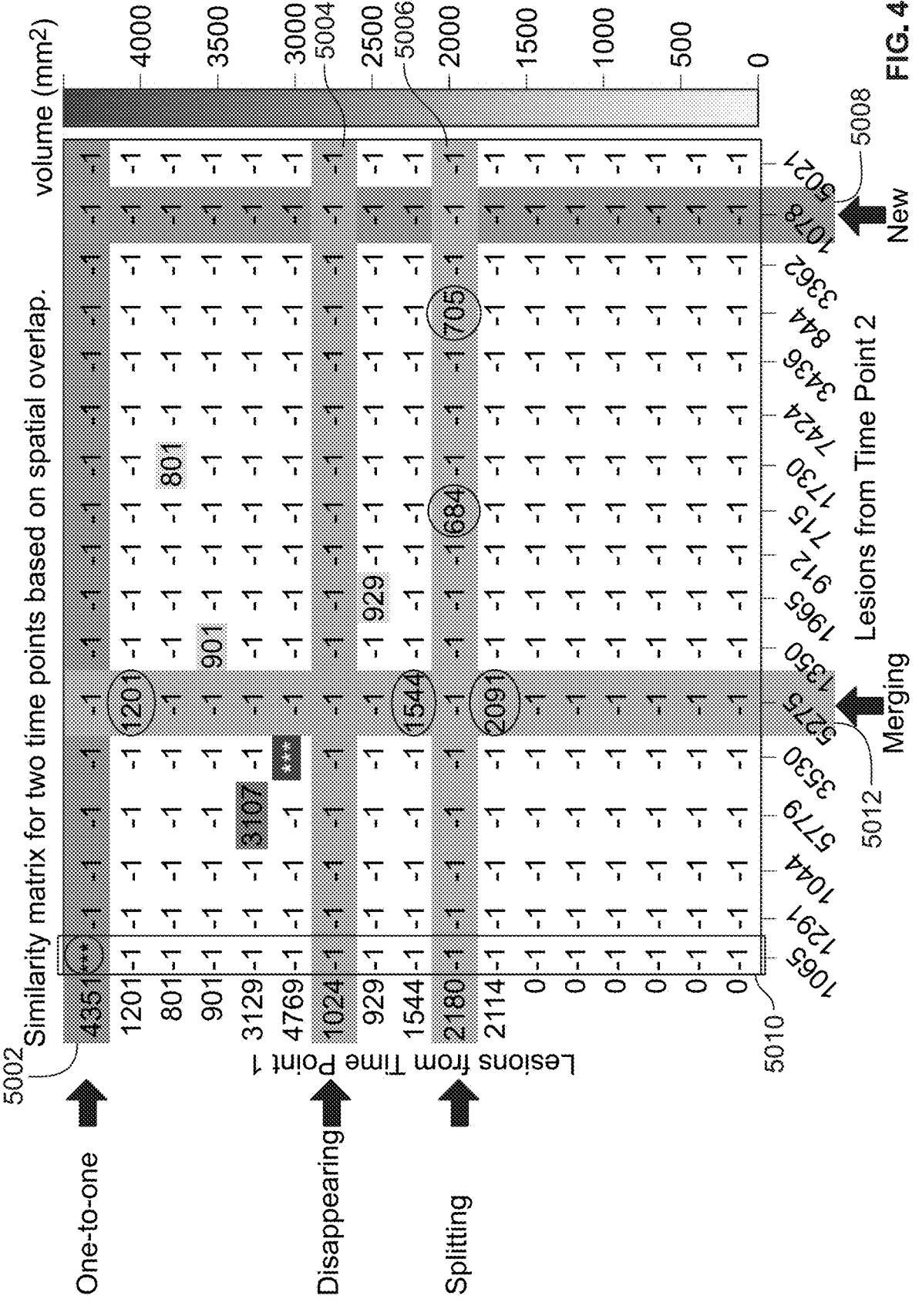
FIG. 4 depicts a similarity map and lesion category assignment for a simulated example.

The similarity scores may be computed for all lesions present in every image taken at different times. FIG. 3 depicts a similarity map 4000 of all lesions present in images taken at times $T_1$ and $T_2$. The similarity map represents a matrix (m, n), where m and n represent the number of lesions in images taken at time points $T_1$ and $T_2$. The x-axis represents the similarity scores for all lesions imaged at time $T_2$ and extends from $L_0$ (the first lesion at each time point) to $L_{n-1}$ (for the n lesions) that are present in the image. The y-axis represents the similarity scores for all lesions imaged at time $T_1$ and extends from $L_{m-1}$ (for the m lesions) that are present in the image to $L_0$ (the first lesion). The similarity matrix size in FIG. 4 is set to maximum values of (m, n) to handle the case where zero lesions are present at one time point. In this event, all of the imaged lesions will be new lesions.

The interpretation of overlapping similarities in the similarity map 4000 in the FIG. 3 is explained with reference to FIG. 4 below. FIG. 4 depicts a similarity matrix for a simulated exercise where a first image that contains 11 lesions at time $T_1$ is mapped to a second image contains 17 lesions at time $T_2$. It is to be noted that the specific similarity matrix in FIG. 4 shows the volume of the overlapping part between lesions (that contain a labeled voxel) imaged at time $T_1$ and time $T_2$. The y-axis (vertical axis) represents the metabolic tumor volume (MTV) for lesions imaged at time $T_1$. The x-axis (horizontal axis) represents the metabolic tumor volume (MTV) for lesions imaged at time $T_2$. Different similarity matrices may be constructed showing other areas of overlapping features (e.g., either geometric, functional or structural features) for lesions imaged at time $T_1$ and time $T_2$. Most of the numbers that can be seen in the map are −1, which is a default value and reflects that there is no overlap between lesions imaged at times $T_1$ and $T_2$. The values (other than −1) in the FIG. 4 indicate overlap in volume (as noted above, the similarity can also be conducted for other features such as, geometric, functional or structural features) between lesions imaged at time $T_1$ and time $T_2$. For example, if a lesion imaged at time $T_1$ has a volume of 100 cubic millimeters and 50% of this volume overlaps with a neighboring lesion when imaged at a time $T_2$ (and the overlapping volume contains the labeled voxel), then the overlapping value in the map in FIG. 4 would be 0.5.

After the map is created, every row and column is systematically examined for overlapping similarities (i.e., to identify matching scenarios) by looking at the values (other than −1) and the number of these different overlapping values in any particular row and column. With reference to FIG. 4, the information (overlapping volume) for all lesions on the y-axis are from the prior image (taken at $T_{n-1}$) where all lesions imaged at $T_1$ are represented in the rows of the table, and the overlapping volume for all lesions on the x-axis are from the current image ($T_n$) and are represented in the columns of the table. Based on that, it is possible to determine whether lesions are from the prior image (taken at $T_{n-1}$) (a given row), overlaps with none, one, or more lesions are from the current image (taken at $T_n$) (the columns with any value other than −1).

If a particular row and column each has only one value (other than −1), it reflects a one-to-one mapping between lesions in the two images. For example, the row represented by numeral 5002 has only one value (which is encircled). Similarly, column 5010 which intersects with row 5002 has only one value (which is the same encircled value at row 5002). This intersecting value indicates that this particular lesion has a one-to-one correspondence between images taken at times $T_1$ and $T_2$. This particular lesion may be shrinking or growing.

A row (see row represented by numeral 5004) that has no values (other than −1) indicates that there is no overlap in similarity (either geometric, functional or structure based similarities) and the lesion is a disappearing lesion. If two or more values (other than −1) are present in a row (see row represented by numeral 5006), then it indicates that the lesion is a splitting lesion. A column that has no values (other than −1) indicates that there is no overlap in similarity (either geometric, functional or structure based similarities) with a lesion at time $T_1$ and the lesion is therefore a new one (see column having numeral 5008). If a column has multiple values (e.g., two or more values) (other than −1) then it means that two or more lesions are from the prior image (at time $T_1$) and merged to form a lesion from the present image (at time $T_2$), which indicates a merging lesion. For example, column 5012 show 3 values (other than −1). This implies that three lesions from the prior image are merged into a lesion from the present image—this indicates a merging lesion. In other words, all lesions from the prior image (indicated by rows with values) are merged to form the lesion from the current image (identified by the investigated column that intersects with these rows that have values other than −1).

While the FIGS. 1-4 and most of the discussion above deal with images taken at two times $T_1$ and $T_2$ only, it is possible to link a plurality of images taken at $T_n$ different times. FIG. 5 depicts a method 6000 of accomplishing this. The method comprises several steps. In step 6002, images obtained at each pair of time points $T_1$ and $T_2$, $T_2$ and $T_3$, $T_3$ and $T_4$, and so on, up to $T_{n-1}$ and $T_n$ are subjected to image alignment and then spatially mapped together via the adaptive search mechanism detailed above (especially with reference to FIGS. 2 and 3).

In step 6004, using the N−1 similarity matrices, iteratively update a customized graph structure. Nodes may represent the lesions and edges may represent different events. In step 6006, the spatial correspondence between each pair of time points in the similarity matrices is used in the adaptive search algorithm to estimate the overlap between lesions imaged at any time point to any earlier time point (as detailed in FIGS. 3 and 4). This is called recursive mapping. In step 6008, a check is conducted for lesions that may disappear and reappear at a later time and update the similarity matrices. In step 6010, traverse the generated graph structure (as detailed with reference to FIG. 5) to generate the final linking or mapping between lesions at time point $T_1$ to time point $T_n$.

In an embodiment, a system for linking images can comprises an imaging device and a microprocessor (not shown). The imaging device comprises at least one of a PET/CT/MRI/SPECT machine that can image one or more lesions present in a living being at different points in time. The microprocessor is operative to execute an adaptive search algorithm on successive images obtained at different points in time from the imaging devices. The adaptive search algorithm may assign a given probability for each voxel of each lesion imaged at time point 1 ($T_1$) and this probability is used to match that voxel with a voxel in one or more lesions imaged at time point 2 ($T_2$), where time point $T_2$ is different from time point $T_1$. Other characteristic information (e.g., geometrical, structural and/or functional features) may be manually supplied to the microprocessor to be integrated with the images. In another embodiment, this other characteristic information may be calculated through image analysis techniques and processed through the construction of the similarity matrix and further analysis. Alternatively, the characteristic information may be provided to the microprocessor via data tables that are stored in the microprocessor. In an embodiment, the microprocessor may integrate the geometrical, structural and/or functional information with images obtained from PET/CT/MRI/SPECT to create a composite image that can be used for a vector search. In yet another embodiment, the geometrical, structural and/or functional information may be directly obtained from PET/CT/MRI/SPECT.

In an embodiment, the microprocessor can acquire images obtained at each pair of time points $T_1$ and $T_2$, $T_2$ and $T_3$, $T_3$ and $T_4$, and so on, up to $T_{n-1}$ and $T_n$ from PET/CT/MRI/ SPECT machines and perform image alignment and then spatially map the images together via the adaptive search mechanism detailed above. The microprocessor is also operative to create N−1 similarity matrices and iteratively update a customized graph structure to generate links between lesions imaged from time point $T_1$ through to $T_n$. A human operator may manually select which other characteristic information (geometrical, structural and/or functional features) is provided to the microprocessor to make determinations about the classification of lesions that undergo splitting, merging, shrinking and so on. In another embodiment, the microprocessor itself may select characteristic information which enables it to make a determination about the classification of lesions that undergo splitting, merging, shrinking and so on. The lesion classification may be used by a physician to determine a course of action or therapy for treating the patient.

The method and system disclosed herein has a number of advantages over other methods of imaging lesions. The introduction of an adaptive search mechanism provides and ability to match the lesions in several images taken at different times in addition to including other image features (texture or other). This permits a calculation of the final similarity score for each lesion imaged at time $T_{n-1}$ to be matched to another lesion imaged at $T_n$, where n is an integer value. In addition it provides the ability to facilitate lesion assignment to one of the different categories (splitting lesions, merging lesions, shrinking lesions, disappearing lesions, and the like), based on the linking and modelling of lesions imaged at different time points. The method has a higher robustness compared with other available methods by including the imaging information with the geometric information in an adaptive way.

The integration of other imaging features (e.g., geometric, functional and/or structural features) can provide additional information to decide the similarity between lesions at different time points. Moreover, ambiguities that may arise during the classification of lesions as being the result of a split (one-to-many) or a merge (many-to-one) may be resolved by the integration of additional imaging features based geometric, functional and/or structural information.

In addition, the advantage of an adaptive search is that it ensures that any errors that may happen from the motion of some parts of the body will be accounted for. Moreover, establishing the spatial correspondence can be challenging in some cases, e.g., the patient at a one-time point gain or lose weight compared to other time points, or the lesion changes over time like decreasing or increasing in size. All these issues can be handled through the adaptive search on a per lesion level.

What is claimed is:

1. A system for linking images of a lesion taken over different periods of time comprising:
  an imaging device that is operative to image one or more lesions present in a living being; where the imaging device takes a first image at a first point in time $T_1$ and a second image at a second point in time $T_2$;
  a microprocessor that is operative to receive the first image and the second image and to perform an adaptive search on the respective images; where the adaptive search comprises:
  selecting a first voxel in a first lesion in the first image;
  radially searching for one or more second lesions in the second image that share one or more overlapping first voxels with the first lesion in the first image; where the radial search is conducted continuously using progressively increasing radii up to a maximum radial threshold value t; and where:
  if no overlap is found upon reaching the threshold value t, then there is no correspondence between the first lesion and the one or more second lesions; or
  if an overlap between the first lesion and one or more second lesions is found, then a determination is made as to the number of first voxels that can fit into each overlapping volume between the first lesion and the one or more second lesions; and
  determining a probability based on a ratio of first voxels that fit into each overlapping volume between the first lesion and each one of the one or more second lesions; where the probability is calculated by dividing the number of first voxels present in each overlapping volume divided by the total number of first voxels in all overlapping volumes between the first lesion and the one or more second lesions; and
  labelling each voxel in the first lesion based on the probability.

2. The system of claim 1, where an initial radial search uses a search radius that corresponds to a size of the first voxel.

3. The system of claim 2, where the search radius is centered at point in the one or more second lesions that corresponds to location of the first voxel in the first lesion.

4. The system of claim 1, where the determining the probability further comprises including characteristics that include geometry, structure and/or function of the first lesion.

5. The system of claim 1, further comprising simultaneously or sequentially conducting N−1 adaptive searches on different lesions present in an $N^{th}$ image taken at time $T_n$; where N is an integer of 2 or greater and where n is a specific time point from 1 to n−1; where n is an integer.

6. The system of claim 1, further comprising integrating the overlap obtained from the first image and the second image with geometric information to obtain a similarity score S for lesions as shown in formula (1)

$$S = W_G \times F_G \times W_P \times F_P + W_C \times F_C, \tag{1}$$

where $F_G$, $F_P$, and $F_C$ represent vectors for geometric, functional and structure based features, while $W_G$, $W_P$, and $W_c$ represent their respective weighting factors.

7. The system of claim 6, further comprising creating a similarity table where an overlap between the lesion imaged at $T_1$ is compared with an overlap in volume with the one or more lesions imaged at $T_2$; where all lesions imaged at time $T_1$ are represented in a rows of the similarity table, and where the one or more lesions imaged at time $T_2$ are represented in the columns of the table.

8. The system of claim 7, where a comparison of similarities is graphically represented.

9. The system of claim 8, where the graphical representation is arranged in rows and columns; and where each row or column can be evaluated for lesion characteristics that include shrinkage, growth, splitting or merging of a particular lesion.

10. The system of claim 1, where the adaptive search is facilitated by an adaptive search algorithm stored on the microprocessor.

11. The system of claim 9, where the lesion characteristics are used by a physician for prescribing therapy to a patient.

12. The system of claim 1, where the imaging device is a positron emission tomography (PET) scanner, an x-ray computed tomography (CT) scanner, a magnetic resonance imaging (MRI) scanner, a single-photon emission computed tomography (SPECT) scanner, or a combination thereof.

13. A method for linking lesions that are imaged at different time periods comprising:
  taking a first image at a first point in time $T_1$ of one or more lesions present in a living being;

17

18 taking a second image at a second point in time $T_2$ the one or more lesions;

performing an adaptive search on the first image and the second image; where the adaptive search comprises:

selecting a first voxel in a first lesion in the first image;

radially searching for one or more second lesions in the second image that share one or more overlapping first voxels with the first lesion in the first image; where the radial search is conducted continuously using progressively increasing radii up to a maximum radial threshold value t; and where:

if no overlap is found upon reaching the threshold value τ, then there is no correspondence between the first lesion and the one or more second lesions; or if an overlap between the first lesion and one or more second lesions is found, then a determination is made as to the number of first voxels that can fit into each overlapping volume between the first lesion and the one or more second lesions; and determining a probability based on a ratio of first voxels that fit into each overlapping volume between the first lesion and each one of the one or more second lesions; where the probability is calculated by dividing the number of first voxels present in each overlapping volume divided by the total number of first voxels in all overlapping volumes between the first lesion and the one or more second lesions; and labelling each voxel in the first lesion based on the probability.

14. The method of claim 13, where an initial search of the radial search uses a search radius that corresponds to a size of the first voxel and where the search radius is centered at point in the second lesion that corresponds to location of the first voxel in the first lesion.

15. The method of claim 13, further comprising simultaneously or sequentially conducting N−1 adaptive searches on different lesions present in an $N^{th}$ image taken at time $T_n$; where N is an integer of 2 or greater and where n is a specific time point from 1 to n−1; where n is an integer.

16. The method of claim 13, further comprising integrating the overlap obtained from the first image and the second image with geometric information to obtain a similarity score S for lesions as shown in formula (1)

$$S = W_G \times F_G \times W_P \times F_P + W_C \times F_C, \qquad (1)$$

where $F_G$, $F_P$, and $F_C$ represent vectors for geometric, functional and structure based features, while $W_G$, $W_P$, and $W_c$ represent their respective weighting factors.

17. The method of claim 16, further comprising creating a similarity table where an overlap between the lesion imaged at $T_1$ is compared with an overlap in volume with the one or more lesions imaged at $T_2$; where all lesions imaged at time $T_1$ are represented in a row of the similarity table, and where the one or more lesions imaged at time $T_2$ are represented in one or more columns of the table.

18. The method of claim 17, where a comparison of similarities is graphically represented; where the graphical representation is arranged in rows and columns; and where each row or column can be evaluated for lesion characteristics that include shrinkage, growth, splitting or merging of a particular lesion.

19. The method of claim 13, where the adaptive search is facilitated by an adaptive search algorithm stored on the microprocessor.

20. The method of claim 13, further comprising adding additional layers pertaining to image based information and/or non-imaged based information to the first and second images to generate a similarity matrix; where the image based information is radiomics information, geometric information, quantitative information, functional information, structural information, or a combination thereof; and where the non-image based information is derived from liquid biopsies include circulating-free tumor deoxyribonucleic acid (ctDNA), circulating-free tumor ribonucleic acid (ctRNA), or both (circulating-free tumor total nucleic acids, ctNA).

21. The method of claim 20, further comprising adding additional layers pertaining to image based information and/or non-imaged based information to the first and second images in multi-tracer studies to determine the mismatch for radionuclide therapy selection.

\* \* \* \* \*